United States Patent [19]
Kugler

[11] Patent Number: 5,613,353
[45] Date of Patent: Mar. 25, 1997

[54] MULCHING ATTACHMENT FOR LAWNMOWERS

[76] Inventor: Jack L. Kugler, 746 NE. 43rd St., Topeka, Kans. 66617

[21] Appl. No.: 437,821

[22] Filed: May 9, 1995

[51] Int. Cl.$^6$ .................................................. A01D 34/70
[52] U.S. Cl. ........................... 56/13.8; 56/16.9; 56/12.7; 56/320.2; 56/202
[58] Field of Search ................................. 56/13.8, 13.6, 56/13.7, 13.9, 13.3, 16.4, 12.1, 12.7, 320.1, 320.2, 202

[56] References Cited

U.S. PATENT DOCUMENTS

| | | | |
|---|---|---|---|
| 2,823,508 | 2/1958 | Brown | 56/25.4 |
| 2,920,435 | 1/1960 | Vallone | 56/13.3 |
| 2,956,386 | 10/1960 | Niemann | 56/25.4 |
| 2,990,666 | 7/1961 | Blume | 56/25.4 |
| 3,790,094 | 2/1974 | Spicer | 56/13.3 X |
| 3,877,207 | 4/1975 | Lemelson | 56/13.2 |
| 3,925,968 | 12/1975 | Wagenhals | 56/13.3 |
| 3,974,629 | 8/1976 | Russell et al. | 56/13.7 |
| 4,114,353 | 9/1978 | Ansbaugh et al. | 56/13.3 |
| 4,158,279 | 6/1979 | Jackson | 56/202 |
| 4,189,905 | 2/1980 | Frantello | 56/295 |
| 4,250,695 | 2/1981 | Corner et al. | 56/12.7 |
| 4,263,771 | 4/1981 | Iaboni et al. | 56/13.4 |
| 4,395,865 | 8/1983 | Davis, Jr. et al. | 56/13.3 |
| 4,472,926 | 9/1984 | Siegrist et al. | 56/13.6 |
| 4,711,073 | 12/1987 | Frier, Jr. et al. | 56/16.6 X |
| 4,819,416 | 4/1989 | Jones | 56/12.7 |
| 4,896,488 | 1/1990 | Duncan et al. | 56/13.7 |
| 4,962,630 | 10/1990 | Jones | 56/12.7 |
| 5,020,309 | 6/1991 | Hopkins | 56/13.9 X |
| 5,048,276 | 9/1991 | Miller | 56/16.9 |
| 5,048,278 | 9/1991 | Jones et al. | 56/12.7 X |
| 5,070,683 | 12/1991 | Eggenmueller | 56/13.8 |
| 5,121,592 | 6/1992 | Jertson | 56/344 |
| 5,142,851 | 9/1992 | Lydy et al. | 56/13.4 |
| 5,224,327 | 7/1993 | Minoura et al. | 56/13.3 |
| 5,226,284 | 7/1993 | Meehleder | 56/11.6 |
| 5,231,827 | 8/1993 | Connolly et al. | 56/13.1 |

Primary Examiner—Terry Lee Melius
Assistant Examiner—Thomas A. Beach
Attorney, Agent, or Firm—Hovey, Williams, Timmons & Collins

[57] ABSTRACT

An improved lawnmower mulching attachment for comminuting grass clippings cut by the mower is provided having a housing defining a mulching chamber, a rotatable mulching impeller within the chamber and a duct intercommunicating the housing and the mower deck, wherein the attachment effectively utilizes the momentum of the laterally discharged grass clippings and suction pressure created by the mulching impeller to transfer the clippings from the mower deck to the mulching chamber. The housing includes an outlet for discharging the comminuted grass clippings and a bottom wall having an inlet leading to the mulching chamber. The housing is mounted above the mower deck of the mower such that the upright axis of the mulching impeller is laterally offset from the upright axis of the cutting element. Further, the duct is connected between the inlet of the housing and the lateral discharge of the mower deck for transferring grass clippings from the deck to the chamber. The mulching impeller is coupled with the power source of the lawnmower so that mulching operations may be selectively controlled by the mower operator.

16 Claims, 2 Drawing Sheets

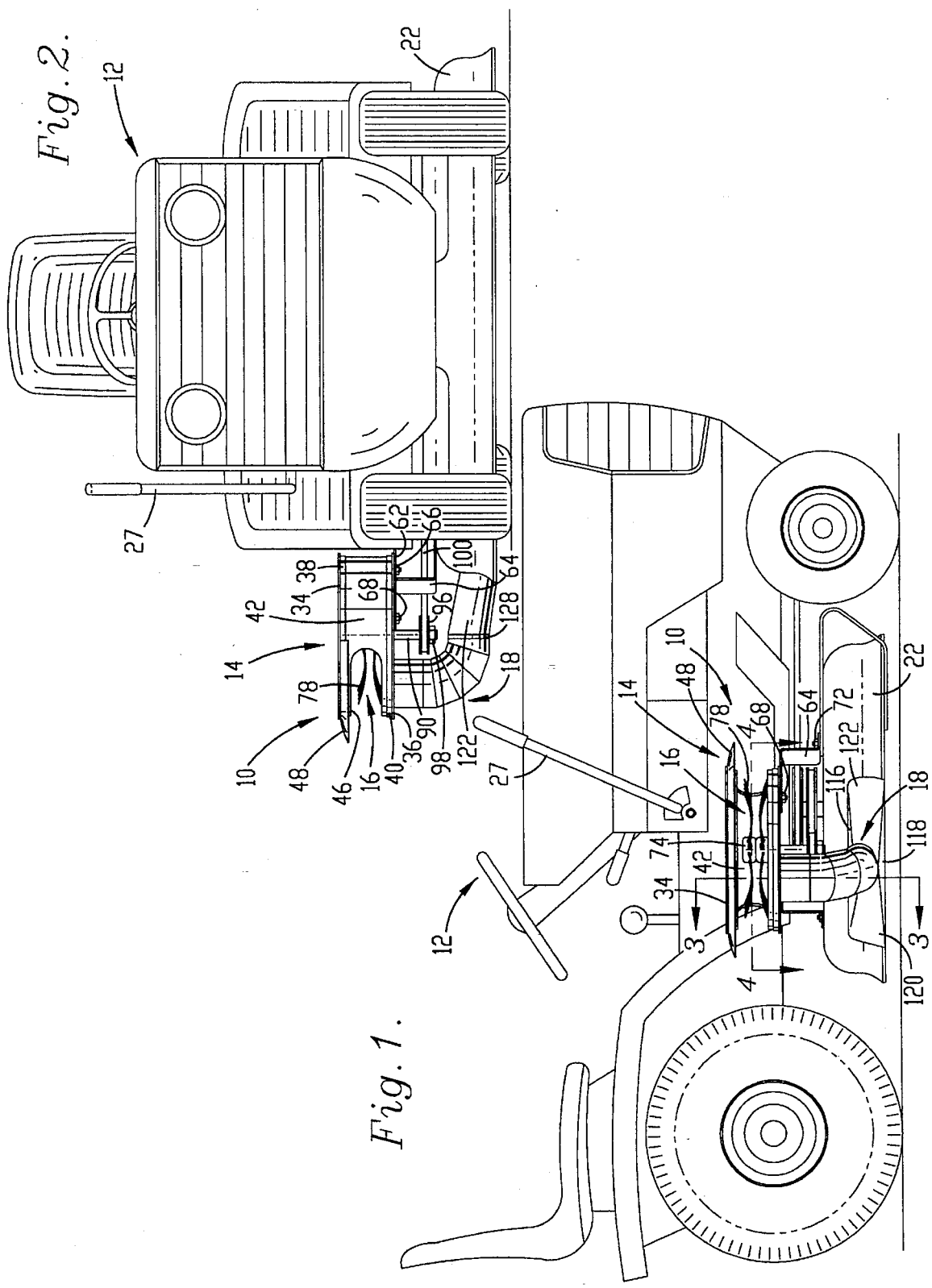

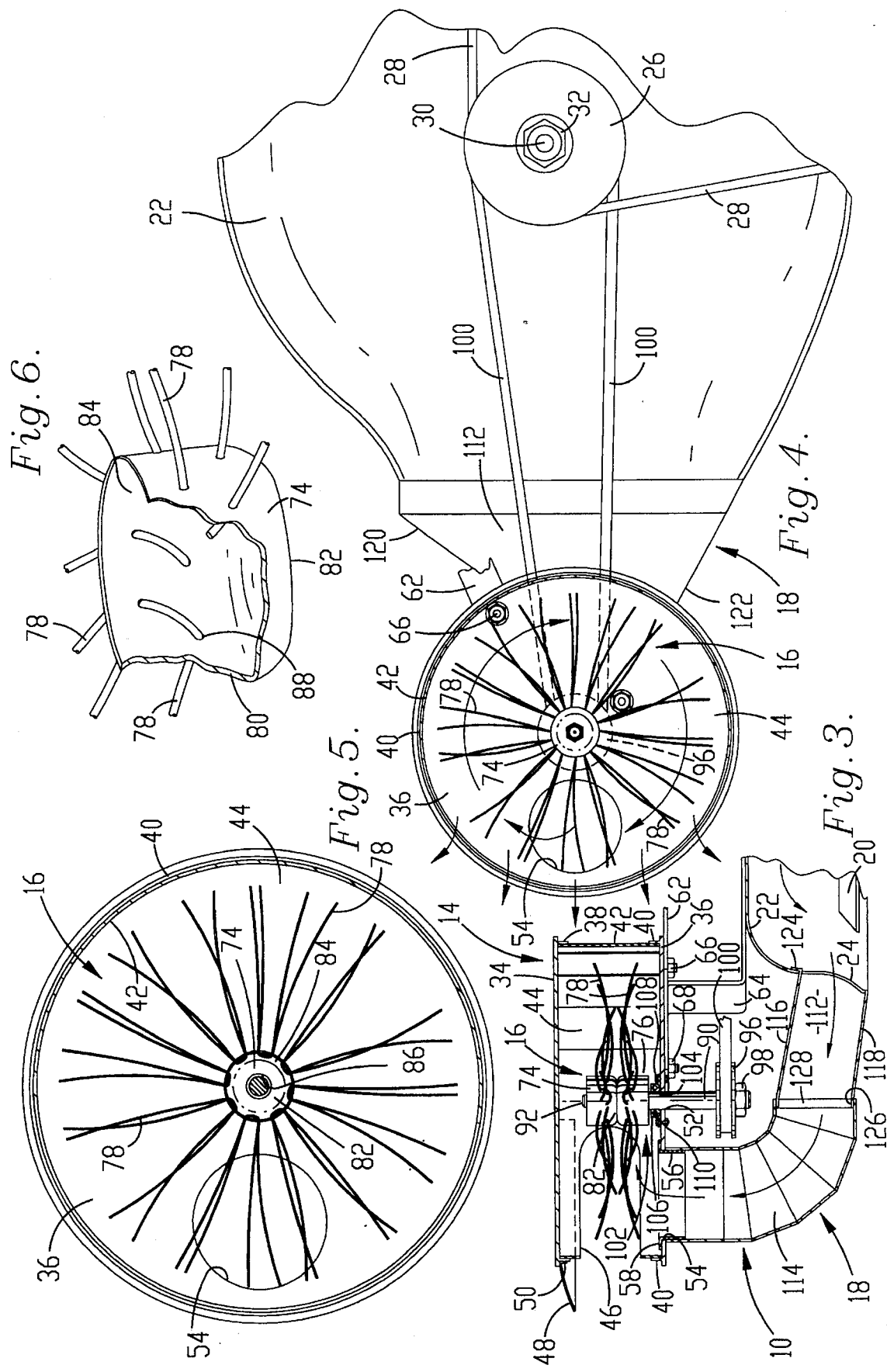

MULCHING ATTACHMENT FOR LAWNMOWERS

BACKGROUND OF THE INVENTION

1. Field of the Invention

The present invention relates generally to lawnmower accessories and, more particularly, to a mulching attachment for comminuting grass clippings from the lawnmower wherein the attachment may be simply retrofit to a conventional mower without having to adjust or modify the mower.

2. Discussion of Prior Art

In the past, lawnmowers have been provided with a container or bag for collecting grass clippings as the grass was cut by the mower. The primary purpose for collecting the clippings in the containers or bags was to eliminate the need to manually rake and bag clippings discharged from the mower deck, which were often left in a windrowed or clumped condition. Thus, conventional collection containers and bags eliminated manual collection the clippings while maintaining the well-manicured appearance of the lawn.

However, conventional collection devices still required the lawnmower operator to stop the machine and empty the bags into a garbage container or compost pile. Additionally, in some instances, it may have been preferred to not collect the clippings, as grass clippings were known to be a beneficial fertilizer for the lawn. Further, as landfills became more and more overburdened, municipalities limited the types of materials that could be deposited in the landfills; lawn refuse often being the first to be disallowed.

In response to these problems, lawnmowers have been provided with mulching structure that comminuted the grass clippings cut by the mower. Conventionally, mulching devices have provided sufficient comminution so that the grass clippings were discharged to the lawn without adversely effecting the appearance. Advantageously, these devices also reduced collection of lawn refuse in municipal landfills and improved fertilization of the mowed lawn.

However, conventional mulching devices have several shortcomings. For example, lawnmowers have been provided with a mulching device within the mower deck or discharge chute to comminute the cut grass. Lawnmowers are also often provided with a specially configured mower blade that cuts and mulches the grass. However, dual purpose cutting blades and mulching devices disposed within the mower deck tend to interfere with the cutting function of the mower and if the grass is too tall the grass will lay down in a row or clump up.

Alternatively, mowers have been provided with mulching containers that are wholly separate from the mower deck. However, such devices hereinbefore developed are configured in a manner that prevents retrofit attachment to conventional lawnmowers (e.g., the mulching container is disposed in vertical alignment with the mower deck). Further, conventional, separate mulching containers provide structure for transferring the grass clippings from the deck to the container that tends to clog during operation. Moreover, the configuration of these devices have failed to effectively utilize the momentum of the grass clippings propelled by the cutting element and the suction pressure created by the rotating mulching element to transfer the grass clippings from the deck to the container. Such ineffective use of the driven components to transfer the clippings from the deck to the container results in horsepower being unnecessarily drawn from the mower engine, which interferes with the cutting and mulching functions of the lawnmower.

Accordingly, there is a real and unsatisfied need in the art to provide a mulching attachment for comminuting grass clippings that is separate from the mowing deck, while providing for retrofit attachment to conventional lawnmowers, and that effectively uses the momentum of the discharged grass clippings and suction pressure of the mulching element to reduce the likelihood of clogging and decrease the horsepower necessary to transfer the clippings from the mower deck to the mulching container.

OBJECTS AND SUMMARY OF THE INVENTION

Accordingly, an important object of the present invention is to provide a mulching attachment that includes a mulching housing separate from the mower deck that communicates with the mower deck in a manner that effectively utilizes the momentum of the grass clippings propelled by the cutting element and the suction pressure created by the rotating mulching element to transfer the grass clippings from the deck to the container.

Another object of the present invention is to provide an attachment that may be used to retrofit a lawnmower for comminuting the grass clippings cut by the mower without having to significantly modify or adjust the mower.

In accordance with these and other objects evident from the following description of a preferred embodiment of the invention, the mulching attachment includes a housing defining a mulching chamber, a rotatable mulching impeller within the chamber and a duct intercommunicating the housing and the mower deck. The housing includes an outlet for discharging the comminuted grass clippings and a bottom wall having an inlet leading to the mulching chamber. The housing is mounted above the mower deck of the mower and in such a manner that the upright axis of the mulching impeller is laterally offset from the upright axis of the cutting element. The duct is connected between the inlet of the housing and the lateral discharge of the mower deck for transferring grass clippings from the deck to the chamber. The mulching impeller is coupled with the power source of the lawnmower so that mulching operations may be selectively controlled by the mower operator.

BRIEF DESCRIPTION OF THE DRAWINGS FIGURES

A preferred embodiment of the invention is described in detail below with reference to the attached drawing figures, wherein:

FIG. 1 is a side elevational view of a riding lawnmower having a mulching attachment constructed in accordance with the preferred embodiment of the invention;

FIG. 2 is a front elevational view of the lawnmower and mulching attachment depicted in FIG. 1;

FIG. 3 is a vertical sectional view taken along line 3—3 of FIG. 1, illustrating the pathway of the grass clippings as the clippings are transferred from the mower deck to the mulching chamber;

FIG. 4 is a horizontal sectional view taken along line 4—4 of FIG. 1, illustrating the circular movement of the grass clippings as the clippings move from the inlet to the outlet of the chamber;

FIG. 5 is an enlarged vertical sectional view of the mulching chamber and mulching impeller; and FIG. 6 is a fragmentary perspective view of the mulching impeller, illustrating attachment of the tines to the hub of the impeller.

DETAILED DESCRIPTION OF THE PREFERRED EMBODIMENT

Turning now to the drawings, and particularly FIGS. 1–4, a mulching attachment, generally designated 10, in accordance with the present invention is illustrated assembled to a conventional riding mower 12. Broadly speaking, the preferred mulching attachment includes a housing 14, a rotatable mulching impeller 16 within the housing, and a duct 18 coupled with the housing 14 and defining a passageway for the grass clippings.

As best shown in FIGS. 1–4, the lawnmower 12 includes a cutting element 20 that is rotatably supported within a downwardly open mower deck 22. Referring particularly to FIG. 3, it will be observed that the mower deck 22 includes, along the leftmost periphery thereof, a lateral discharge opening 24 for discharging grass clippings cut by the cutting element 20 from the mower deck 22. Above the mower deck 22, the lawnmower 12 is provided with a drive sheave 26 that is drivingly connected to the power source (not shown) of the tractor by an endless belt 28. In the conventional manner, the lawnmower operator selectively controls driving power to the drive sheave 26 by manipulating control lever 27. Although not illustrated in detail, it will be appreciated that the cutting element 20 is mechanically coupled with the drive sheave 26 by mechanical structure that includes threaded shaft 30 and nut 32. The cutting element 20 is axially aligned with the drive sheave 26, and thus, shaft 30 defines a first upright axis of rotation for the cutting element 20. Further, lawnmower 12 is provided with an additional cutting element (not shown) supported rightwardly of the illustrated cutting element 20. However, the number of rightwardly disposed cutting elements provided on the lawnmower 12 does not affect the operation of the present invention.

In more detail, the housing 14 is preferably formed of galvanized steel and incldues a circular top wall 34 and axially spaced circular bottom wall 36. The top wall 34 includes a downwardly projecting lip 38 that is spaced radially inward of the top wall periphery. Likewise, the bottom wall 36 includes an upwardly projecting lip 40. The housing further includes a tubular, cylindrical side wall 42 that extends between the top wall 34 and bottom wall 36. The side wall 42 abuttingly engages the lips 38, 40 and may be secured thereto by conventional means, such as spot welding, snug-fit, or the like. The top wall 34, bottom wall 36, and side wall 42 define a cylindrical mulching chamber 44, wherein grass clippings from the lawnmower 12 are comminuted. Preferably, the top wall 34 is removably attached to the side wall 42 providing access to the mulching chamber 44.

It is observed in FIGS. 1, 2 and 5 that side wall 42 includes a lateral, arcuate outlet opening 46 that leads from the mulching chamber 44. A deflector shield 48, which includes a small vertical flange 50 that is connected to the lip 38 of the top wall 34 by conventional methods, extends along the length of the outlet opening 46. The deflector shield 48 deflects grass discharged from the chamber 44 towards the ground and shields a mower operator from objects thrown from the mulching chamber 44.

As best shown in FIGS. 3-5, the bottom wall 36 includes a centrally located shaft opening 52 and an offset inlet opening 54 that leads to the mulching chamber 44. Preferably, for reasons which will subsequently be described, the bottom wall 36 and side wall 42 are interconnected so that the inlet opening 54 is adjacent the outlet opening 46. A cylindrical connector 56 (FIG. 3) is furnished to fit snugly within the inlet opening 54 so that the duct 18 may be connected to the housing 14. The connector 56 is provided with a radially extending leg 58 so that the connector may be attached to the bottom wall 36 by conventional means, such as spot welding.

In the illustrated embodiment, the housing 14 is attached to the lawnmower 12 by a pair of Z-shaped angle arms 62, 64. Angle arms 62, 64 are fastened to the bottom wall 36 by conventional nut and bolt fasteners 66, 68 (see FIGS. 3 and 4) and are fastened to the mower deck 22 of the lawnmower 12 by similar fasteners 70, 72, respectively.

As best shown in FIGS. 3–5, the mulching impeller 16 is concentrically disposed within the mulching chamber 44. The preferred mulching impeller 16 generally includes an upper hub 74, an axially aligned and oppositely disposed lower hub 76, and a plurality of radially extending, circumferentially and vertically spaced tines 78. The tines 78 are preferably formed of a flexible monofilament. If desired, a degradable tine material may be used wherein the tines are installed too long (i.e., such that the tine are rubbing against sidewall 42) and subsequently wear during operation to the exact length of the inside of the sidewall to provide scouring engagement with the sidewall and to prevent buildup of grass residue in the mulching chamber 44.

It will be observed that upper hub 74 and lower hub 76 are substantially identical and that description of the hubs hereinbelow is limited to the upper hub 74. The hub 74 is preferably formed of a cup-shaped body having a cylindrical outer wall 80 and floor 82, which define an inner cavity 84. The floor 82 of the hub 74 is provided with a central aperture 86. Further, an even number of tine-receiving holes 88 are located within outer wall 80 for receiving the monofilament tines 78. As shown in FIG. 6, a single monofilament strand projects through one of the tine-receiving holes 88, into the inner cavity 84, and outwardly through another of the tine-receiving holes 88 in a looped fashion to form a pair of the tines 78, 78. It will be appreciated that the centrifugal force acting on both ends of the single monofilament strand prevents slippage thereof.

As best shown in FIG. 3, a vertical shaft 90 is received within the central aperture 86 of each of the hubs 74, 76 for supporting the impeller 16 within the chamber 44. It will be observed that the hubs 74, 76 are mounted on the vertical shaft 90 in an oppositely faced fashion (hub floor 82 to hub floor 82). As will subsequently be described, the shaft 90 is rotatably supported by the housing 14 such that the shaft defines a second upright axis of rotation for the mulching impeller 16. The housing 14 is attached to the lawnmower 12 so that the second upright axis of the mulching impeller 16 is laterally offset from the first upright axis of the cutting element 20. It will be appreciated that this offset configuration facilitates retrofit attachment to conventional lawnmowers.

Preferably, the shaft has an uppermost reduced diameter portion 92 that defines a shoulder (not shown) for abuttingly engaging the floor 82 of the lower hub 76. It will be appreciated that the reduced diameter portion 92 has threads running along the length thereof so that a nut 94 (see FIG. 4) may be threaded on the shaft 90 for releasably securing the hubs 74, 76 to the shaft.

A driven sheave 96 is releasably fastened to the lowermost end of shaft 90 by nut 98. An endless belt 100 entrains the driven sheave 96 with drive sheave 26 so that driving power is concurrently supplied to the cutting element 20 and mulching impeller 16. The shaft 90 is rotatably mounted to the housing by a bearing assembly, generally denoted 102, which is attached to the bottom wall 36 immediately above and concentric with the shaft opening 52. The bearing assembly 102 includes an inner race 104 that is secured to shaft 90 by a set screw (not shown), an outer race 106 secured to the bottom wall 36 by threaded fasteners 108, and rolling elements 110 between the inner race 104 and outer race 106 permitting relative movement therebetween.

Turning particularly to FIGS. 3 and 4, the duct 18 is preferably formed of galvanized steel and includes a substantially horizontal transition portion 112 and cylindrical, upwardly extending curved portion 114. The transition portion 112 includes top margin 116, bottom margin 118 and side margins 120, 122. As shown in FIG. 3, the transition portion 112 is preferably provided with a small upstanding extension 124 that may be used to attach the portion 112 to the mower deck 22 by conventional means, such as spot welding, mechanical fasteners or the like. The rightmost end of the transition portion (i.e., adjacent the lawnmower 12) is configured to mate with the discharge opening 24 of the mower deck 22. The top, bottom and side margins 116, 118, 120, 122, respectively, converge towards a cylindrical nipple 126 that seats within a socket 128 of the curved portion 114. Preferably, the nipple 126 and socket 128 are spot welded together to insure communication between the mower deck 22 and mulching chamber 44 during operation. Additionally, the uppermost end of the curved portion 114 is adapted to snugly encircle the connector 56 provided at the inlet 54. Accordingly, a passageway for the grass clippings from the mower deck to the mulching chamber is defined by the duct 18.

In operation, the lawnmower operator simultaneously controls operation of the mulching attachment 10 and cutting element 20 by manipulating control lever 27. When cutting and mulching operations are desired, the operator shifts the control lever 27 so that driving power is supplied from the lawnmower power source to drive sheave 26 via belt 28, and from drive sheave 26 to driven sheave 96 via belt 100. Accordingly, the cutting element 20 and mulching impeller 16 are rotated concurrently. However, it will be appreciated that the preferred ratio of the drive sheave diameter to the driven sheave diameter is approximately 2:1, and thus, the mulching impeller 16 rotates about twice as fast as the cutting element 20. For example, if the power source of the lawnmower 12 rotates the cutting element 20 at 3500 rpm, the rotational speed of the mulching impeller 16 is approximately 7000 rpm.

As depicted by the grass clippings flow arrows in FIG. 3, grass clippings cut by the cutting element 20 are propelled laterally through the discharge opening 24. The lateral momentum of the discharged grass clippings forces the clippings into the transition portion 112 of the duct 18, upwardly through the curved portion 114, through the inlet 54, and ultimately into the mulching chamber 44. Additionally, the high rotational speed of the mulching impeller 16 creates negative pressure within the duct 18 to assist in the transfer of the grass clippings from the mower deck 22 to the mulching chamber 44. Thus, the laterally offset impeller 16, as previously described, allows the use of a horizontally disposed duct portion 112, which effectively utilizes the lateral momentum of the grass clippings to assist in transferring the clippings to the mulching chamber 44. Further, the inlet opening 54 located in the bottom wall 36 of the housing 14 unexpectedly prevents overloading and clogging of the mulching chamber 44 and allows the suction pressure created by the mulching impeller 16 to act in concert with the lateral momentum of the grass clippings to transfer the clippings through the duct 18.

As illustrated by the grass clippings flow arrows in FIG. 4, the clippings are delivered to the mulching chamber via the inlet opening 54. As described, the inlet opening 54 in the bottom wall 36 is adjacent the outlet opening 46. Accordingly, grass clippings must move upwardly through the chamber 44 before being discharged therefrom through the outlet opening 46. Moreover, the rotating mulching impeller 16 prevents grass clippings from moving directly upward towards the outlet 46. As illustrated, the grass clippings must travel at least one rotation before moving sufficiently upward to be discharged from the mulching chamber 44 via the outlet opening 46. Invariably, this increases comminution of the grass clippings. Further, because of the vertical spacing of the tines 78 and upward movement of the grass clippings within the mulching chamber 44, mulching contact between the clippings and mulching impeller 16 is increased, improving comminution of the grass clippings.

Of course, the present invention may also be utilized as an mulching attachment to retrofit conventional lawnmowers for comminution of the grass clippings cut thereby. Further, although the foregoing description focused on a mulching attachment for riding lawnmowers, it is entirely within the scope of the present invention to furnish a push-type lawnmower with the claimed mulching attachment. Thus, the preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A mulching attachment for lawnmowers for comminuting grass clippings cut by the lawnmower, said lawnmower including a cutting element rotatable about a first upright axis, a downwardly open mower deck overlying said cutting element and having a lateral discharge opening therein, and a power source drivingly connected to said cutting element, said mulching attachment comprising:

a mulching impeller for comminuting the grass clippings, said impeller being rotatable about a second upright axis;

said mulching impeller including a hub positioned along said second upright axis, a first row of circumferentially spaced flexible tines extending radially from said hub, and at least one additional, vertically spaced row of circumferentially spaced flexible tines extending radially from said hub;

means for operably coupling the mulching impeller to the power source of the lawnmower:

a housing defining a mulching chamber receiving said impeller, said housing including an outlet leading from said chamber and a bottom wall having inlet leading to said chamber:

structure for mounting said housing above the mower deck such that said second upright axis of the impeller is laterally offset from said first upright axis of the cutting element; and a duct connectable between said discharge opening of the lawnmower and said inlet of the housing for transferring the grass clippings from the mower deck to the mulching chamber.

2. In a mulching attachment as claimed in claim 1, said housing further including a top wall and a cylindrical side wall disposed between said top and bottom wall, said outlet being disposed within said sidewall to form a lateral discharge for the comminuted grass.

3. In a mulching attachment as claimed in claim 2, said inlet being disposed adjacent said outlet such that grass clippings delivered to the chamber are propelled in a circular path by the mulching impeller before being discharged from said chamber providing increased comminution of said clippings.

4. In a mulching attachment as claimed in claim 1, said hub having an outer wall defining an inner cavity and a plurality of tine-receiving holes formed in said outer wall, a pair of said tines being formed of a single monofilament strand projecting inwardly through one of said tine-receiving holes and outwardly through another of said holes in a looped fashion.

5. In a mulching attachment as claimed in claim 1, said duct including a horizontally disposed transition portion adapted for connection with said lateral discharge of the mower and a curved portion connectable with said inlet of the housing for directing grass clippings from said transition portion upwardly towards said inlet.

6. A mulching attachment for lawnmowers for comminuting grass clippings cut by the lawnmower, said lawnmower including a cutting element rotatable about a first upright axis, a downwardly open mower deck overlying said cutting element and having a lateral discharge opening therein, and a power source drivingly connected to said cutting element, said mulching attachment comprising:

a mulching impeller for comminuting the grass clippings, said impeller being rotatable about a second upright axis;

means for operably coupling the mulching impeller to the power source of the lawnmower;

a housing defining a mulching chamber receiving said impeller, said housing including an outlet leading from said chamber and a bottom wall having inlet leading to said chamber;

structure for mounting said housing above the mower deck such that said second upright axis of the impeller is laterally offset from said first upright axis of the cutting element; and a duct connectable between said discharge opening of the lawnmower and said inlet of the housing for transferring the grass clippings from the mower deck to the mulching chamber, said housing further including a top wall and a cylindrical side wall disposed between said top and bottom wall, said outlet being disposed within said sidewall to form a lateral discharge for the comminuted grass, said housing further including a deflector shield attached to said top wall adjacent said outlet to shield a lawnmower operator from comminuted grass discharged from the chamber and to deflect said comminuted grass toward the ground.

7. A mulching attachment for lawnmowers for comminuting grass clippings cut by the lawnmower, said lawnmower including a cutting element rotatable about a first upright axis, a downwardly open mower deck overlying said cutting element and having a lateral discharge opening therein, and a power source drivingly connected to said cutting element, said mulching attachment comprising:

a mulching impeller for comminuting the grass clippings, said impeller being rotatable about a second upright axis;

means for operably coupling the mulching impeller to the power source of the lawnmower;

a housing defining a mulching chamber receiving said impeller, said housing including an outlet leading from said chamber and a bottom wall having inlet leading to said chamber;

structure for mounting said housing above the mower deck such that said second upright axis of the impeller is laterally offset from said first upright axis of the cutting element; and a duct connectable between said discharge opening of the lawnmower and said inlet of the housing for transferring the grass clippings from the mower deck to the mulching chamber, said mulching impeller including a hub and a plurality of circumferentially spaced monofilament tines extending radially from said hub, said side wall of the housing being cylindrical and concentric with said impeller such that said tines are in scouring engagement with said side wall.

8. A mulching attachment for lawnmowers for comminuting grass clippings cut by the lawnmower, said lawnmower including a cutting element rotatable about a first upright axis, a downwardly open mower deck overlying said cutting element and having a lateral discharge opening therein, and a power source drivingly connected to said cutting element, said mulching attachment comprising:

a mulching impeller for comminuting the grass clippings, said impeller being rotatable about a second upright axis;

means for operably coupling the mulching impeller to the power source of the lawnmower;

a housing defining a mulching chamber receiving said impeller, said housing including an outlet leading from said chamber and a bottom wall having inlet leading to said chamber:

structure for mounting said housing above the mower deck such that said second upright axis of the impeller is laterally offset from said first upright axis of the cutting element; and a duct connectable between said discharge opening of the lawnmower and said inlet of the housing for transferring the grass clippings from the mower deck to the mulching chamber;

said mulching impeller including a pair of stacked hubs, each of said hubs having a plurality of circumferentially and vertically spaced apart monofilament tines extending therefrom.

9. In combination with a lawnmower including a cutting element rotatable about a first upright axis, a downwardly open mower deck overlying said cutting element and having a lateral discharge opening therein, and a power source drivingly connected to said cutting element, a mulching attachment for comminuting grass clippings cut by the lawnmower, said mulching attachment comprising:

a mulching impeller for comminuting the grass clippings, said impeller being rotatable about a second upright axis laterally offset from said first upright axis of the cutting element, said mulching impeller including a hub positioned along said second upright axis, a first row of circumferentially spaced flexible tines extending radially from said hub, and at least one additional, vertically spaced row of circumferentially spaced flexible tines extending radially from said hub;

means for operably coupling the mulching impeller to the power source of the lawnmower;

a housing mounted on the lawnmower above the mower deck defining a mulching chamber receiving said impeller, said housing including an outlet leading from said chamber and a bottom wall having an inlet leading to said chamber: and a duct connected between said discharge opening of the lawnmower and said inlet of the housing for transferring the grass clippings from the mower deck to the mulching chamber.

10. In a combination as claimed in claim 9, said housing further including a top wall and a cylindrical side wall disposed between said top and bottom wall, said outlet being disposed within said sidewall to form a lateral discharge for the comminuted grass.

11. In a combination as claimed in claim 10, said inlet being disposed adjacent said outlet such that grass clippings delivered to the chamber are propelled in a circular path by the mulching impeller before being discharged from said chamber providing increased comminution of said clippings.

12. In a combination as claimed in claim 9, said hub having an elongated outer wall defining an inner cavity and a plurality of tine-receiving holes formed in said outer wall, a pair of said tines being formed of a single monofilament strand projecting inwardly through one of said tine-receiving holes and outwardly another of said holes in a looped fashion.

13. In a combination as claimed in claim 9, said duct including a horizontally disposed transition portion interconnected with said lateral discharge of the mower, and a curved portion interconnected with said inlet of the housing for directing grass clippings from said transition portion upwardly towards said inlet.

14. In combination with a lawnmower including a cutting element rotatable about a first upright axis, a downwardly open mower deck overlying said cutting element and having a lateral discharge opening therein, and a power source drivingly connected to said cutting element, a mulching attachment for comminuting grass clippings cut by the lawnmower, said mulching attachment comprising:

a mulching impeller for comminuting the grass clippings, said impeller being rotatable about a second upright axis laterally offset from said first upright axis of the cutting element;

means for operably coupling the mulching impeller to the power source of the lawnmower;

a housing mounted on the lawnmower above the mower deck defining a mulching chamber receiving said impeller, said housing including an outlet leading from said chamber and a bottom wall having an inlet leading to said chamber; and a duct connected between said discharge opening of the lawnmower and said inlet of the housing for transferring the grass clippings from the mower deck to the mulching chamber, said housing further including a top wall and a cylindrical side wall disposed between said top and bottom wall, said outlet being disposed within said sidewall to form a lateral discharge for the comminuted grass, said housing further including a deflector shield attached to said top wall adjacent said outlet to shield a lawnmower operator from comminuted grass discharged from the chamber and to deflect said comminuted grass toward the ground.

15. In combination with a lawnmower including a cutting element rotatable about a first upright axis, a downwardly open mower deck overlying said cutting element and having a lateral discharge opening therein, and a power source drivingly connected to said cutting element, a mulching attachment for comminuting grass clippings cut by the lawnmower, said mulching attachment comprising:

a mulching impeller for comminuting the grass clippings, said impeller being rotatable about a second upright axis laterally offset from said first upright axis of the cutting element;

means for operably coupling the mulching impeller to the power source of the lawnmower;

a housing mounted on the lawnmower above the mower deck defining a mulching chamber receiving said impeller, said housing including on outlet leading from said chamber and a bottom wall having an inlet leading to said chamber; and a duct connected between said discharge opening of the lawnmower and said inlet of the housing for transferring the grass clippings from the mower deck to the mulching chamber, said mulching impeller including a hub and a plurality of circumferentially spaced monofilament tines extending radially from said hub, said side wall being cylindrical and concentric with said impeller such that said tines are in scouring engagement with said side wall.

16. In combination with a lawnmower including a cutting element rotatable about a first upright axis, a downwardly open mower deck overlying said cutting element and having a lateral distance opening therein, and a power source drivingly connected to said cutting element, a mulching attachment for comminuting grass clippings cut by the lawnmower, said mulching attachment comprising:

a mulching impeller for comminuting the grass clippings, said impeller being rotatable about a second upright axis laterally offset from said first upright axis of the cutting element;

means for operably coupling the mulching impeller to the power source of the lawnmower;

a housing mounted on the lawnmower above the mower deck defining a mulching chamber receiving said impeller, said housing including an outlet leading from said chamber and a bottom wall having an inlet leading to said chamber; and a duct connected between said discharge opening of the lawnmower and said inlet of the housing for transferring the grass clippings from the mower deck to the mulching chamber, said mulching impeller including a pair of stacked hubs, each of said hubs having a plurality of circumferentially and vertically spaced apart monofilament tines extending therefrom.

* * * * *